US006928381B2

(12) United States Patent
Becker-Irvin et al.

(10) Patent No.: US 6,928,381 B2
(45) Date of Patent: Aug. 9, 2005

(54) BATTERY OVERTEMPERATURE CONTROL SYSTEM AND METHOD

(75) Inventors: Craig Becker-Irvin, Redondo Beach, CA (US); Mark Y. Honda, Los Angeles, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/738,188

(22) Filed: Dec. 17, 2003

(65) Prior Publication Data

US 2005/0137823 A1 Jun. 23, 2005

(51) Int. Cl.[7] .............................................. G01K 1/00

(52) U.S. Cl. ...................... 702/130; 702/132; 320/150; 320/151; 320/153

(58) Field of Search .............................. 702/130, 132; 320/150, 151, 153

(56) References Cited

U.S. PATENT DOCUMENTS

| 4,313,078 | A | * | 1/1982 | Bilsky et al. ................ 320/101 |
| 5,157,320 | A | * | 10/1992 | Kuriloff ........................ 320/151 |
| 5,617,006 | A | * | 4/1997 | Lenhart et al. .............. 320/134 |
| 5,686,815 | A | * | 11/1997 | Reipur et al. ................ 320/116 |
| 5,834,923 | A | * | 11/1998 | Lewin et al. ................ 320/147 |
| 5,864,220 | A | * | 1/1999 | Reipur et al. ................ 320/134 |
| 5,912,547 | A | * | 6/1999 | Grabon ........................ 320/150 |
| 6,075,339 | A | * | 6/2000 | Reipur et al. ................ 320/110 |
| 6,278,260 | B1 | * | 8/2001 | Yang ............................ 320/150 |
| 2001/0001533 | A1 | * | 5/2001 | Andersen et al. ........... 320/150 |

* cited by examiner

*Primary Examiner*—John Barlow
*Assistant Examiner*—Anthony Dougherty
(74) *Attorney, Agent, or Firm*—McNees Wallace & Nurick LLC

(57) ABSTRACT

A control system and method for a battery charger. The system includes a processor that receives inputs from a battery current sensor and temperature sensors within the batteries. The processor terminates and resumes charging in response to measured battery temperatures compared to stored reference values in order to prevent high temperatures associated with damage to the batteries.

21 Claims, 4 Drawing Sheets

BATTERY OVERTEMPERATURE CONTROL SYSTEM AND METHOD

BACKGROUND OF THE INVENTION

The present invention relates generally to battery chargers and more specifically to a method of preventing damage to batteries during charging.

In the field of battery chargers for satellite applications, a charger is typically employed to transfer electrical energy generated by solar panels to chemical energy stored by battery packs. Many satellites experience an eclipse season where relative motion of the body that it orbits, such as the earth, results in the body being between the satellite and the sun. Typical eclipse duration for a satellite in geo-synchronous earth orbit is 1.2 hours, or about 1 hour, 12 minutes. During an eclipse, the batteries may power the operation of required experiments, correctional navigation, communications, or other vital functions. In order to power the operations of the satellite, it is generally desired that the batteries be fully charged at the beginning of each eclipse. A battery that is not adequately charged at the outset of an eclipse may result in unwanted conditions that necessitate limited operations or a total loss of the satellite.

A concern for battery charger control is preventing overcharge. Briefly, when a battery is fully charged, the cells have chemically stored a desired amount of electrical energy. As more energy is transferred to the cells through overcharging, undesirable chemical reactions within the cells typically result in a temperature rise. Severe battery overcharge can produce high battery temperatures, which may lead to an inability to charge the battery. In a satellite application, severe overcharge can also result in operational difficulties with the batteries for several days. Severe battery overcharge can also result in battery damage, fire, disruption of service, or catastrophic loss of a satellite.

Conventional battery chargers for satellite applications incorporate a thermal switch into each battery to prevent overcharge. The thermal switch is typically preset to terminate the charging cycle at a preselected battery temperature. This method takes advantage of the fact that battery cell temperature will increase during overcharge. One drawback to the use of a thermal switch is that it does not compensate for the temperature of the battery at the outset of the charging cycle. If the battery is at a relatively low temperature at the beginning of a charge cycle, the battery may be allowed to severely overcharge as battery temperature increases to the thermal switch set point. If the battery temperature is high at the beginning of the charge cycle, either due to a discharge or as a result of heat generated by other sources such as the sun, microwave amplifiers or other batteries, all of which can provide excess heat to a satellite, then the thermal switch may terminate the charging cycle prematurely.

Yet another concern for battery chargers in satellite applications is the lack of protective systems in the case of a failure within the charging system. One failure of concern is related to continuous battery charging. A failure that results in continuous battery charging may result in the same undesirable conditions as severe battery overcharge. What is needed, therefore, is a battery overtemperature control that will account for battery temperature rise during charging to prevent overcharging. A favorable battery overtemperature control would also be capable of preventing a battery overcharge in the event of selected battery charger failure modes.

SUMMARY OF THE INVENTION

The present invention is directed to a method for preventing battery damage in the event of a failure in an automatic battery charging system. In one aspect, the present invention provides a method of controlling battery temperature wherein the battery temperature is monitored and used to determine acceptable temperature setpoints for battery charger control. The method further includes energizing and de-energizing the battery charger as the battery temperature reaches these setpoints.

In another aspect, the present invention provides a control system for a battery charger. The control system uses a processor to monitor battery temperature and determine battery reference temperatures. The control system is configured to terminate the battery charge cycle when battery temperature rise during charging reaches a preselected value.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
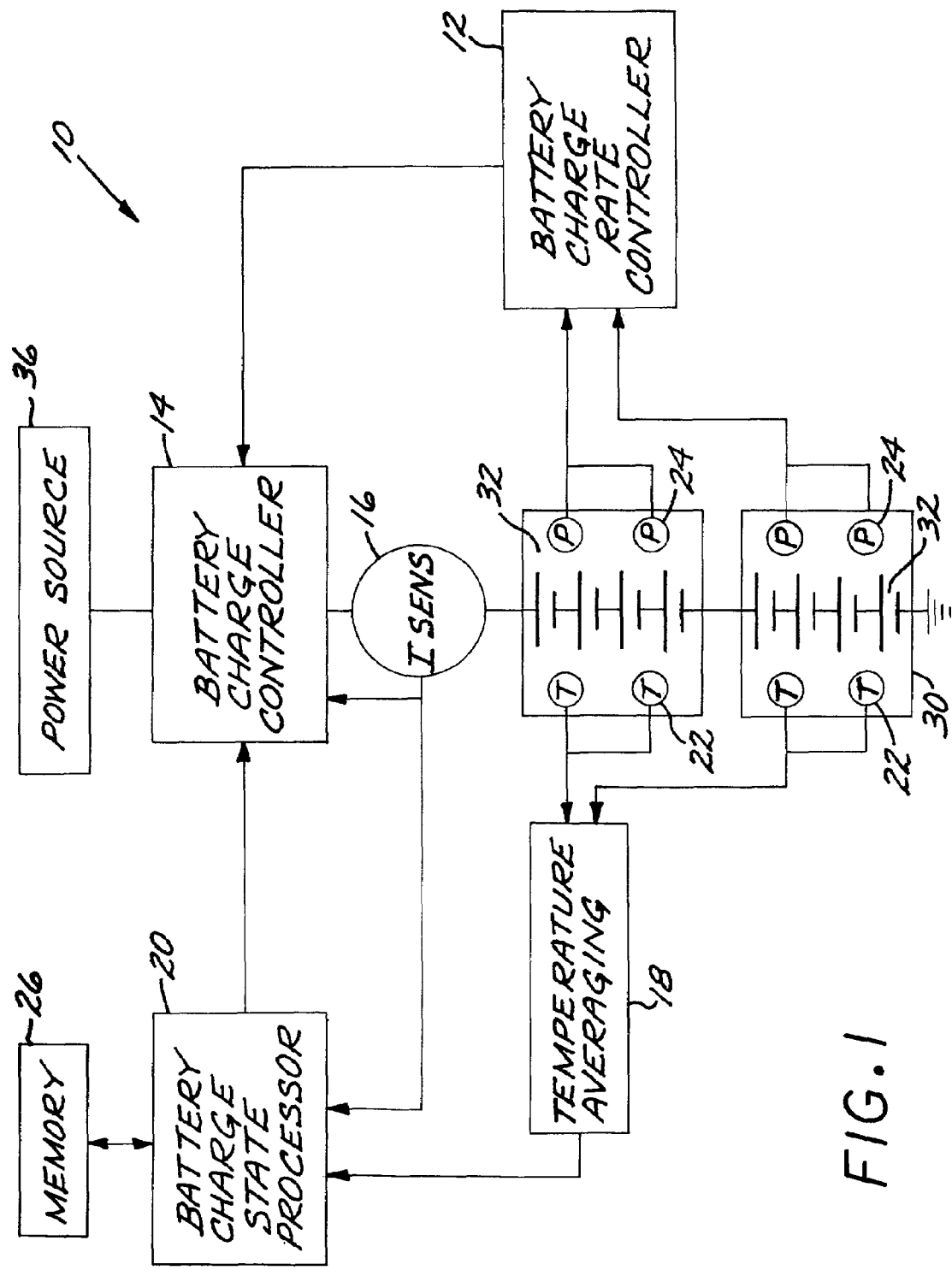
FIG. 1 is a schematic diagram of the battery overtemperature control system of the present invention.

With reference to FIG. 1, a battery control system 10 of the present invention is shown to include a battery charge rate controller 12, a battery charge controller 14, a current sensor 16, a temperature averaging module 18, a battery charge state processor 20, temperature sensors 22, pressure sensors 24, and a memory 26. Control system 10 is used with a battery pack 30, which is comprised of a plurality of battery cells 32. The battery charge controller 14 is electrically coupled to a power source 36 and can provide battery charging current from power source 36 to battery pack 30 in response to a battery charge rate command from battery charge rate controller 12. In a satellite application, power source 36 may be a solar array, or the spacecraft power bus. Battery charge state processor 20 is in communication with the memory 26.

Current sensor 16 provides an output, Ibattery (not numbered), that is indicative of the magnitude of battery charge current. Typically, battery charge controller 14 will use Ibattery to regulate battery charge current provided to the battery pack 30, as described below.

Temperature averaging module 18 monitors inputs from temperature sensors 22 in battery cells 32 and calculates an average temperature, Tbatavg (not numbered), which the temperature averaging module 18 provides to battery charge state processor 20. Battery charge state processor 20 also monitors output Ibattery from current sensor 16 and compares this output to Dthreshold (not numbered). If Ibattery is less than Dthreshold, the battery pack 30 is being discharged.

In the foregoing discussion and in the battery charge state processor 20 logic, the following terms are defined as:

Tbatavg—the average detected, or measured, battery temperature of battery pack 30 output from temperature averaging module 18.

Tbatref—a battery reference temperature recorded in memory 26 and used in a comparison to determine an unacceptable temperature rise. Tbatref is variable and can be set to the lower of the previous Tbatref or the most recent Tbatavg.

ΔTrise—a first preselected value, the approximate safe increase in temperature during a high rate battery charge, a constant programmed or stored in memory 26.

ΔTdrop—a second preselected value, the amount of temperature drop in a battery pack that indicates that the chemical reactions that caused overcharging in the battery pack have ceased, a constant programmed or stored in memory 26.

Tovertemp—a third preselected value, the maximum battery temperature allowed, a constant programmed or stored in memory 26.

Tbatmax—the battery overtemperature threshold, a variable equal to Tbatref+ΔTrise. Tbatmax cannot exceed Tovertemp.

Ibattery—an output of current sensor 16 indicative of battery current.

Dthreshold—a numerical value representing battery discharge current threshold, a constant programmed or stored in memory 26.

In operation, battery charge rate controller 12 monitors the pressure sensors 24 to determine the pressure in battery cells 32. In the embodiment shown, at least one battery cell 32 has a pressure sensor 24 attached thereto for monitoring pressure within the battery cell 32. The battery charge rate controller 12 issues a high battery charge rate command when the battery pressure in battery cells 32 is less than a predetermined battery pressure value, and issues a low battery charge rate command when the battery pressure in at least one battery cell 32 is greater than the predetermined battery pressure value. Battery charge controller 14 receives the battery charge rate command from battery charge rate controller 12 and adjusts the battery charge rate accordingly. As will be appreciated, the predetermined battery pressure value for this operation should be selected for the specific battery type.

Battery charge state processor 20 monitors output Ibattery of current sensor (Isens) 16 and the average temperature calculated by temperature averaging module 18. Battery charge state processor 20 is configured to read preprogrammed or stored values from memory 26 and store values in memory 26, as described below.

When battery charge rate processor 20 determines that Ibattery is less than Dthreshold, the battery is discharging and Tbatref is set to an initial value of Tovertemp−ΔTdrop. This provides a high value, or maximum battery reference temperature, for Tbatref to ensure that a new Tbatref will be determined for each battery charge cycle. A battery charge state command (terminate or resume) is not sent to battery charge state processor 20 during battery discharge.

FIGS. 2 through 5 illustrate a scenario over a 24-hour period that could initiate a command from battery charge state processor 20. The scenario presented is illustrative of a Ni—H battery, although any battery that experiences a temperature rise during overcharge, such as, for example, Li based batteries, may benefit from the invention described herein. In summary of this scenario, the satellite has an orbit period of 24 hours and an eclipse duration of about 1.2 hours. During the eclipse, from 0.0 hours to 1.2 hours, the battery discharges to support the satellite loads. This discharge causes the battery to heat in normal fashion from about −1° C. to 15° C. due to internal chemical reactions. After the eclipse ends, the battery pack 30 is charged as it cools. A temperature rise occurs at about time=16 hours due to a failure in battery control system 10 that allowed battery charging to continue after full charge. Although a conventional battery overtemperature system may not detect this temperature rise, battery charge state processor 20 detects this rise and sends a signal to the battery charge controller 14 to terminate charging. As discussed herein, battery charge state processor 20 will terminate the charge cycle when Tbatavg exceeds Tbatmax, and resume the charge cycle when Tbatavg falls below Tbatmax−ΔTdrop.

Figure 2:
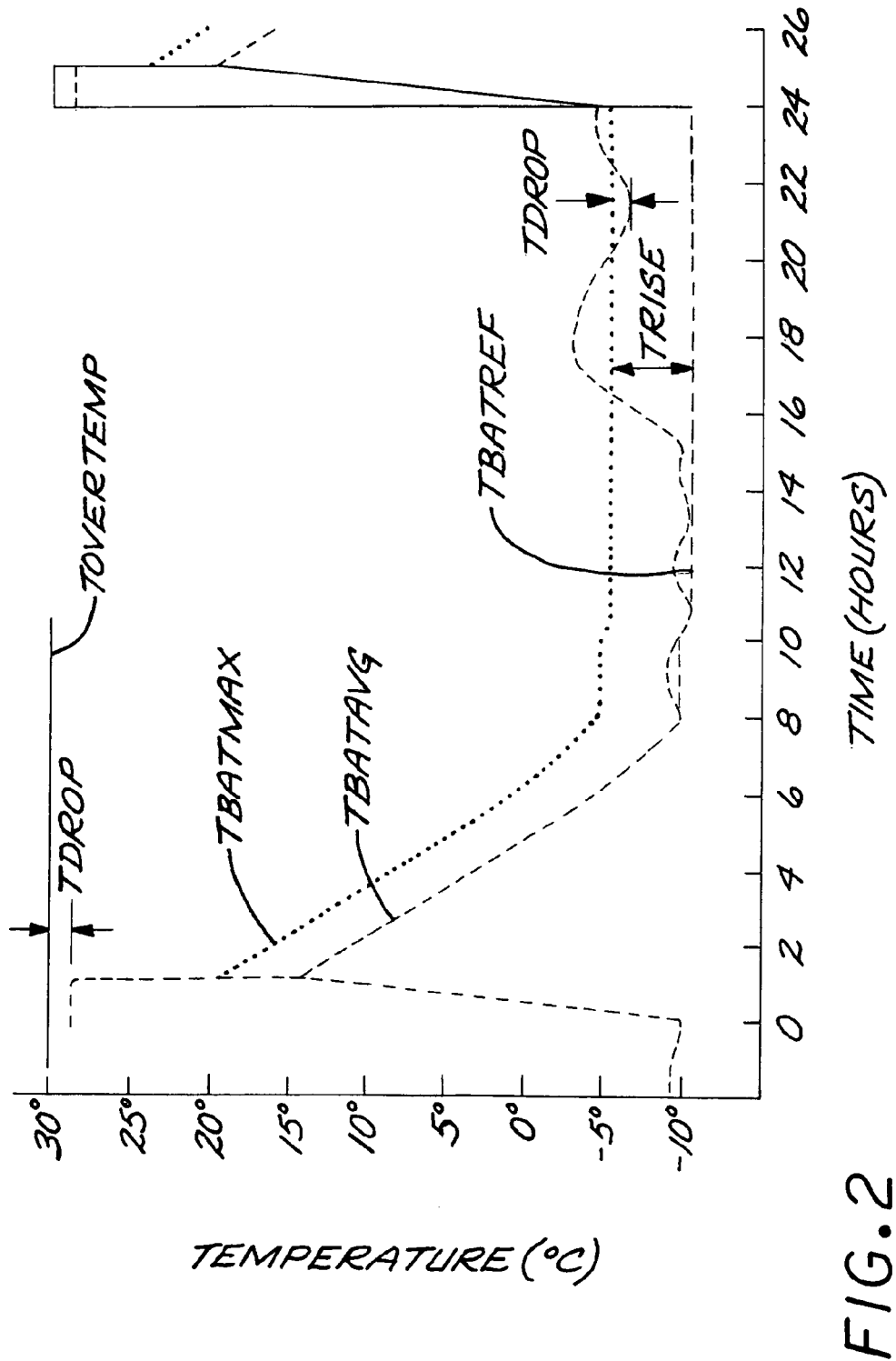
FIG. 2 is a graphic representation of exemplary battery temperatures for a hypothetical scenario in a 24-hour period, illustrating the associated reference temperatures.
Figure 3:
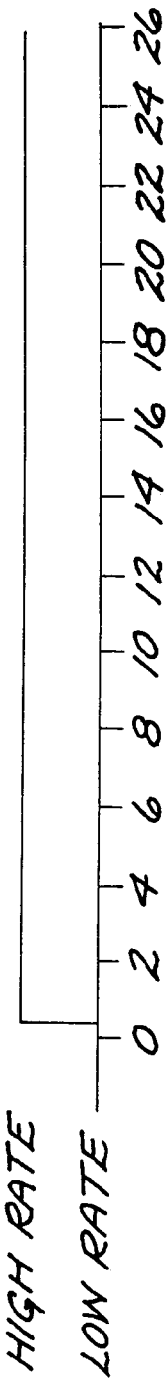
FIG. 3 is a graphical representation of the battery charge rate command for the scenario of FIG. 2.
Figure 4:
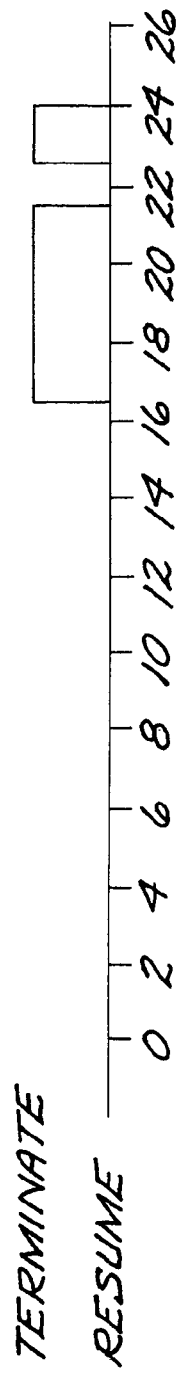
FIG. 4 is a graphical representation of the output command from the processor to the battery charger for the scenario of FIG. 2.
Figure 5:
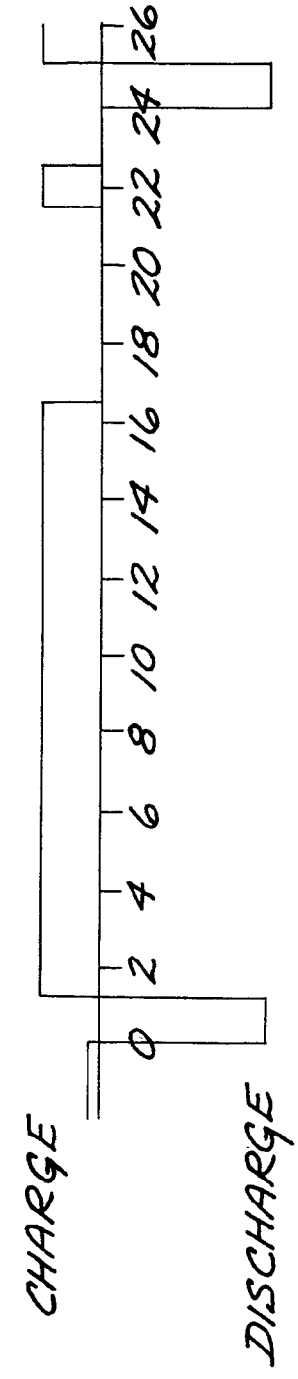
FIG. 5 is a graphical representation of the battery current detected for the scenario of FIG. 2.

Providing more detail of the scenario illustrated in FIGS. 2–5, a postulated fault within battery control system 10 has occurred and caused the battery charge rate command from battery charge rate controller to remain at a high rate, as best seen in FIG. 3. As seen in FIG. 5, the battery pack 30 is discharging until about time=1.2 hours. After the battery discharge, battery charge controller 14 would detect that the output Ibattery from current sensor (Isens) 16 indicates that battery pack 30 is no longer discharged. Battery charge controller 14 would then send a signal to connect power source 26 to battery pack 30 in order to recharge battery pack 30.

With reference to FIG. 2, the average battery temperature, Tbatavg, rises from about −10° C. to 15° C. during the battery discharge. After time=1.2 hours, battery charge state processor 20 receives an input, Ibattery, from current sensor 16 to indicate that battery pack 30 is no longer discharging. Battery charge state processor 20 periodically resets Tbatref, and records Tbatref in memory 26. Tbatref is preferably performed about once every 10 minutes, more preferably about once every one minute, and even more preferably about once every 30 seconds. Tbatavg then falls until about time=8 hours as battery pack 30 cools and is charged. During the period between time=1.2 hours to time=8 hours, battery charge state processor 20 continues to monitor Tbatavg and periodically records a value, Tbatref, in memory 26. Tbatref is recorded as the lower of the previous value of Tbatref or Tbatavg. Between time=8 hours and time=9 hours, Tbatavg rises as the battery is charged, and Tbateref remains constant. Storing Tbatref in memory 26 provides a battery reference temperature value that will be used for determining a value to compare to Tbatavg as battery temperature increases. For this comparison, battery charge state processor 20 sets Tbatmax equal to Tbatref+ΔTrise.

Between time=10 hours and time=11 hours, Tbatavg falls to −10° C. and battery charge state processor 20 resets Tbatref in memory 26 accordingly. In this manner, battery control system 10 retains a lowest recorded temperature value for battery pack 30 as Tbatref.

With continuing reference to FIG. 2, Tbatavg exceeds Tbatmax (−5° C.) at about time=16.5 hours. When this occurs, battery charge state processor 20 changes the battery charge state command from 'resume' to 'terminate', as seen in FIG. 4. In this manner, battery charge state processor 20 interrupts a battery charge cycle when battery temperature rises a preselected amount during charging, or in this example, 5° C. For comparison, a conventional control system would not interrupt the charging cycle until the battery temperature exceeded 30° C., or a rise of 40° C.

At about time=21.5 hours, Tbatavg falls below Tbatmax−ΔTdrop, and battery charge state processor 20 resumes the charge cycle by sending a 'resume' command to the battery charge controller 14. In this manner, battery pack 30 is allowed to resume charging to ensure a full battery charge before the next eclipse. At about time=22.5 hours, Tbatavg again exceeds Tbatmax and battery charge state processor 20 changes the battery charge state command from 'resume' to 'terminate'. Thus provided, Tbatmax and Tbatmax−ΔTdrop are used as battery temperature thresholds that are compared to Tbatavg in determining a battery charge state command.

Finally, for the example provided, at time=24 hours, the satellite enters an eclipse, the battery begins to discharge, battery charge state processor 20 detects that Ibattery is less than Dthreshold, and Tbatref is set to Tovertemp−ΔTdrop, and the cycle repeats. The battery charge state processor 20 will continue to protect battery pack 30 during charging until the fault is automatically corrected, or can be corrected by a technician at a distant control station located, for example, on earth.

In the example provided, an unmanned satellite is provided with a control system that records the lowest battery temperature during each charging cycle and terminates the charging cycle if battery temperature exceeds this recorded value by a preselected amount. This terminating function of the control system acts as an overcharge protective feature in the event of a charging fault. It would be appreciated that preprogrammed reference values ΔTrise, ΔTdrop, and Tovertemp could be reprogrammed as desired from either a local, or distant control station.

Figure 6:
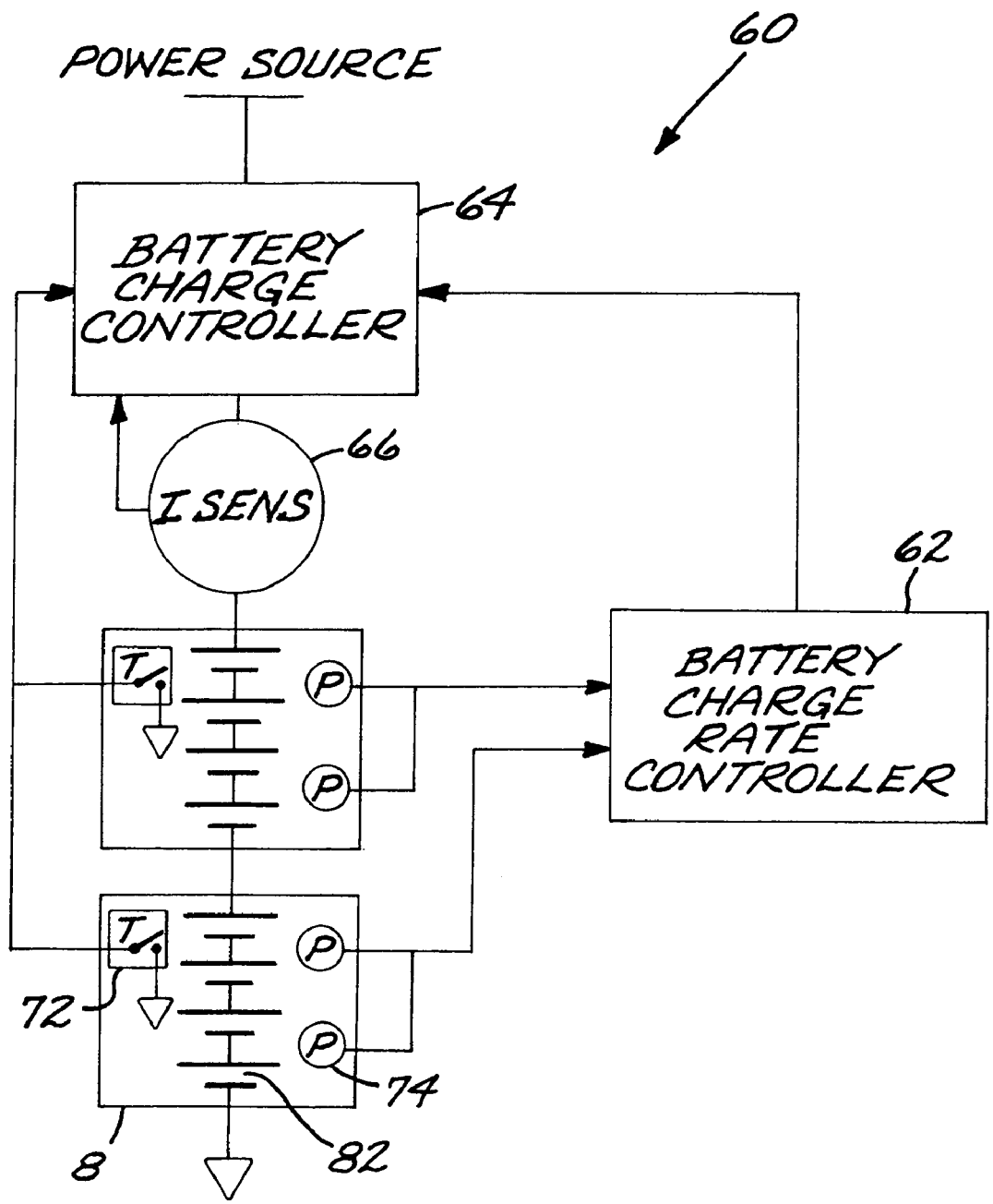
FIG. 6 is a schematic diagram of a prior art battery overtemperature control system.

FIG. 6 illustrates a prior art control system 60. Control system 60 includes a battery charge rate controller 62, a battery charge controller 64, a current sensor 66, a thermal switch 72, and a pressure sensor 74. Control system 60 is illustrated with a battery pack 80, which is comprised of a plurality of battery cells 82. Pressure sensors 74 and battery charge rate controller 62 operate similar to pressure sensors 24 and battery charge rate controller 12 as discussed above. Typically, thermal switch 72 is interconnected into control system 60 such that thermal switch 72 can send a signal to battery charge controller 64 to terminate a charge cycle. Thermal switch 72 is generally adjusted to send the signal to battery charge controller 64 when the thermal switch 72 detects a temperature at or above a preselected setpoint.

FIG. 7 illustrates the logic flow of the battery charge state processor 20. Block 100 initiates the routine. Block 110 determines whether the battery is discharging. Typically, this determination is positive when Ibattery is less than Dthreshold. If the determination made in block 110 is positive, the routine proceeds to block 120. If the determination made in block 110 is negative, the routine proceeds to block 130.

Block 120 sets Tbatref equal to Tovertemp minus Tdrop, and the routine returns to block 110. Block 130 starts a timer at T=N, where N is a predetermined amount of time, preferably about 30 seconds, and the routine proceeds to block 140. In block 140, the routine detects Tbatavg and resets this value in memory 26, and the routine proceeds to block 150. Block 150 resets Tbatref as the lower of Tbatavg, or the most recent Tbatref, and resets Tbatmax as the lower of Tbatref plus Trise or Tovertemp, and the routine proceeds to block 160.

Block 160 determines whether Tbatavg is greater than Tbatref. If the determination made in block 160 is positive, the routine proceeds to block 170. If the determination made in block 160 is negative, the routine proceeds to block 180. Block 170 terminates the charging cycle, and the routine returns to block 110.

Block 180 determines whether Tbatavg is lower than Tbatmax minus Tdrop. If the determination made in block 180 is positive, the routine proceeds to block 190. If the determination made in block 180 is negative, the routine proceeds to block 200. Block 190 resumes the charging cycle, and the routine returns to block 110.

Block 200 determines whether the timer has reached zero. If the determination made in block 200 is positive, the routine returns to block 110. If the determination made in block 200 is negative, the routine returns to block 200.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling battery temperature during a charging operation, the method comprising the steps of;
    calculating a battery temperature;
    determining a battery reference temperature, wherein the step of determining the battery reference temperature includes setting the battery reference temperature to the lower of a prior battery reference temperature or the calculated battery temperature;
    comparing the calculated battery temperature to a battery temperature threshold, wherein the battery temperature threshold is based upon the battery reference temperature; and
    controlling a battery charger in response to the comparison of the measured battery temperature to the battery temperature threshold.

2. The method of claim 1, further comprising the steps of:
    detecting a battery current; and
    comparing the battery current to a preselected current threshold,
    wherein determining the battery reference temperature includes resetting the battery reference temperature to a value representative of a preselected maximum battery reference temperature when the detected battery current falls below the preselected current value.

3. The method of claim 1, wherein the step of determining the battery reference temperature is completed at least about every ten minutes.

4. The method of claim 1, wherein the step of determining the battery reference temperature is completed at least about every minute.

5. The method of claim 1, further comprising the steps of:
    detecting a battery cell pressure; and
    determining a battery charge state as a function of the detected battery cell pressure.

6. The method of claim 1, wherein the step of controlling the battery charger comprises terminating a battery charge cycle.

7. The method of claim 6, wherein the step of terminating a battery charge cycle is performed when the calculated battery temperature exceeds the battery temperature threshold.

8. The method of claim 1, wherein the step of controlling the battery charger comprises resuming a battery charge cycle.

9. The method of claim 8, wherein the step of resuming a battery charge cycle is performed when a battery temperature threshold exceeds the calculated battery temperature by a preselected value.

10. The method of claim 1, wherein the step of calculating a battery temperature comprises averaging a plurality of battery temperature measurements.

11. The method of claim 10, wherein the step of averaging the plurality of battery temperature measurements is performed about every minute.

12. The method of claim 1, further comprising the step of storing a reference value in a memory.

13. The method of claim 12, wherein storing a reference value in the memory includes storing the battery reference temperature.

14. The method of claim 12, wherein storing a reference value in the memory includes storing the maximum battery reference temperature.

15. The method of claim 12, wherein storing a reference value in the memory includes storing a battery overtemperature threshold.

16. The method of claim 12, wherein storing a reference value in the memory includes storing the second preselected value.

17. A control system for a battery charger comprising:
a temperature sensor for measuring a battery temperature; and
a processor including a memory, the processor configured to determine a battery reference temperature by determining the lower of a prior battery temperature stored in the memory and the measured battery temperature the processor then comparing the measured battery temperature to a battery temperature threshold based on the battery reference temperature determined by the processor, the processor storing the lower of the measured battery temperature and the prior battery temperature in the memory, and wherein the processor is further configured to terminate a charging cycle in response to the comparison of the measured battery temperature and the battery temperature threshold, wherein the processor is further configured to periodically reset the battery overtemperature threshold.

18. The control system of claim 17, wherein the processor is further configured to resume charging in response to a comparison of the measured battery temperature and a second battery temperature threshold.

19. The control system of claim 17, wherein a value indicative of the reference temperature may be reprogrammed as desired.

20. The control system of claim 19, wherein the processor is located within a satellite and the memory may be reprogrammed from a distant control station.

21. The control system of claim 18, wherein the memory is further configured to store data calculated by the processor, and the processor is further configured to retrieve the data from the memory.

* * * * *

UNITED STATES PATENT AND TRADEMARK OFFICE
CERTIFICATE OF CORRECTION

PATENT NO. : 6,928,381 B2 Page 1 of 1
DATED : August 9, 2005
INVENTOR(S) : Becker-Irvin et al.

It is certified that error appears in the above-identified patent and that said Letters Patent is hereby corrected as shown below:

<u>Title page,</u>
Item [75], Inventors, "Los Angeles," should be -- Torrance --.

<u>Column 8,</u>
Line 4, "temperature" should be -- temperature, --.
Line 28, "claim 18" should be -- claim 19 --.

Signed and Sealed this

Fourteenth Day of March, 2006

JON W. DUDAS
*Director of the United States Patent and Trademark Office*